United States Patent [19]

Inoue

[11] 4,333,806

[45] Jun. 8, 1982

[54] METHOD OF AND APPARATUS FOR ELECTROEROSIVELY MACHINING A CONTOUR IN A WORKPIECE WITH A TRAVELING-WIRE ELECTRODE

[75] Inventor: Kiyoshi Inoue, Tokyo, Japan

[73] Assignee: Inoue-Japax Research Incorporated, Yokohama, Japan

[21] Appl. No.: 182,648

[22] Filed: Aug. 29, 1980

[30] Foreign Application Priority Data

Aug. 30, 1979 [JP] Japan .................................. 54-110551

[51] Int. Cl.³ .............................. B23P 1/02; B23P 1/12
[52] U.S. Cl. ................................ 204/129.1; 204/129.2; 204/206; 204/224 M; 204/225; 204/129.5; 219/69 W
[58] Field of Search ................. 204/129.1, 206, 224 M, 204/225, 129.5; 219/69 W

[56] References Cited

U.S. PATENT DOCUMENTS

| | | | |
|---|---|---|---|
| 3,493,710 | 2/1970 | Moore | 219/69 W |
| 3,731,044 | 5/1973 | Ullmann et al. | 204/225 X |
| 3,943,322 | 3/1976 | Lehmann et al. | 219/69 W X |
| 4,114,015 | 9/1978 | Vasiliev et al. | 219/69 W |

FOREIGN PATENT DOCUMENTS

| | | | |
|---|---|---|---|
| 395216 | 1/1974 | U.S.S.R. | 219/69 W |
| 622612 | 7/1978 | U.S.S.R. | 204/224 M |

*Primary Examiner*—Delbert E. Gantz
*Assistant Examiner*—Donald R. Valentine
*Attorney, Agent, or Firm*—Karl F. Ross

[57] ABSTRACT

A method of and apparatus for electroerosively machining a desired contour in a workpiece with a wire electrode transported from a supply to a takeup and, in a path therebetween, supported by a pair of wire guide heads to tightly stretch the axially advancing wire electrode across the workpiece. On at least one side of the two opposite surfaces of the workpiece traversed by the wire electrode there is disposed a template blank secured to the workpiece and having a contour shaped to correspond to the desired contour to be machined in the workpiece for holding the axially advancing wire electrode on the surface of the template contour between the wire guide heads across the workpiece. At least one of the wire guide heads is movable and displaced to cause the machining wire electrode to move transversely to the axis thereof along the contour of the template block so that with the transverse movement of the wire electrode, the desired contour is progressively formed in the workpiece by electroerosion.

19 Claims, 2 Drawing Figures

400 words

METHOD OF AND APPARATUS FOR ELECTROEROSIVELY MACHINING A CONTOUR IN A WORKPIECE WITH A TRAVELING-WIRE ELECTRODE

FIELD OF THE INVENTION

The present invention relates to a method of and an apparatus for forming a desired contour in a workpiece by the process of wire cut electroerosion.

BACKGROUND OF THE INVENTION

In the process of wire cut electroerosion, also called traveling-wire electroerosion, a continuous wire electrode is axially transported from supply means, e.g. a reel, to takeup means, e.g. a reel. In the path of wire travel, a workpiece is disposed transversely to the axis of the wire electrode to define a machining gap therewith which gap is flooded with a liquid machining medium, e.g. distilled water. A machining current, typically in the form of a succession of pulses, is passed between the workpiece and the wire electrode across the machining gap to electroerosively remove material from the workpiece. As material removal proceeds, the workpiece carried on a worktable is displaced relative to the wire electrode transversely to the axis thereof which is generally fixed in position along a predetermined path which determines the shape of a contour formed in the workpiece. Over a part of the wire electrode, a pair of guide heads are commonly employed to tightly stretch the traveling wire electrode therebetween and to fix the axis of the wire electrode in a machining position relative to the workpiece. Thus, heretofore any intricate contour as desired has been achieved by displacing the workpiece or the worktable on which it is fixedly mounted relative to the wire electrode which is fixed in its axial position. The workpiece or the worktable must be displaced along the path corresponding to the desired contour and this displacement which directly affects the accuracy of the machined contour requires sophisticated software and hardware to make, convert, process and follow the signals with high precision and consequently makes the process and the apparatus both complicated and expensive.

OBJECTS OF THE INVENTION

It is, accordingly, an important object of the invention to provide a simplified method of electroerosively machining a desired contour in a workpiece with a traveling wire electrode.

Another object of the invention is to provide an electroerosion method of wire-cutting a desired contour in a workpiece, entailing less expensive and complicated arrangements.

A further object of the invention is to provide an apparatus for electroerosively machining a desired contour in a workpiece, which apparatus is simpler in construction and less expensive than the conventional wire-cutting electroerosion apparatus.

SUMMARY OF THE INVENTION

In accordance with the present invention there is provided, in a first aspect thereof, a method of electroerosively machining a desired contour in a workpiece with a wire electrode axially transported from supply means, e.g. a reel, to takeup means, e.g. a reel, and supported under tension by a pair of guide heads so as to traverse the workpiece in a path therebetween while defining a liquid flooded electroerosive machining gap with the workpiece, the method comprising the steps of: disposing on at least one side of the two opposite surfaces of the workpiece traversed by the axially advancing wire electrode and in a predetermined fixed relationship with the workpiece a template block formed with a template contour corresponding to the desired contour to be machined in the workpiece; holding with said template contour the wire electrode advancing tightly stretched between said heads across the workpiece; electrically energizing the workpiece and the axially advancing wire electrode to electroerosively remove material from the workpiece across the machining gap; and displacing at least one of said guide heads to cause the axially advancing wire electrode to move transversely to the axis thereof along said template contour, thereby permitting the desired contour to be progressively formed in the workpiece with the transverse movement of the wire electrode.

Specifically, the block may have an opening formed internally with said template contour. The block may then be a female die with the said formed template contour providing a female die surface and the workpiece may then be a male die with its machined contour providing a male die surface, the male and female dies being for use as a set.

The block may have a periphery formed externally with said template contour. The block may then be a male die with its formed template contour providing a male die surface and the workpiece may then be a female die with its machined contour providing a female die surface, the male and female dies being for use as a set.

It is advantageous to arrange two such template blocks on the respective opposite sides of the workpiece. The two template blocks may then have formed contours which are identical in shape and be size and disposed flush with each other across the workpiece.

When the desired contour to be formed in the workpiece, should have a taper, the template contours in the two blocks respectively disposed on the opposite sides of the workpiece are similar in shape but different in size, the difference in size corresponding to the desired taper.

In a second aspect thereof, the invention provides an apparatus for electroerosively machining a desired contour in a workpiece with a wire electrode axially transported from supply means, e.g. a reel, to takeup means, e.g. a reel, and supported to traverse the workpiece while defining a liquid flooded electroerosive machining gap with the workpiece, the apparatus comprising: a pair of guide heads disposed in a path of the wire electrode between the supply means and the takeup means for supporting the wire electrode tightly under tension between the guide heads; a template block having a contour formed therein corresponding to said desired contour, the block being securely mounted relative to the workpiece for holding the wire electrode axially advancing stretched between said heads across the workpiece; a power supply for electrically energizing the workpiece and the wire electrode to electroerosively remove material from the workpiece across the machining gap; and means for displacing at least one of said guide heads to cause the axially advancing wire electrode to move transversely to the axis thereof along the template contour, thereby permitting the desired contour to be progressively formed in the workpiece with the transverse movement of the wire electrode.

Specifically, the means for displacing the movable wire guide head or heads may include a servo-control circuit responsive to an electrical signal representing the gap spacing between the workpiece and the wire electrode or the state in the machining gap for controlling the position and/or the rate of displacement of the movable wire guide head or heads, thereby controlling the position and/or rate of transverse movement of said wire electrode along said template contour.

The means for displacing may include rotary means having the movable guide head or heads secured thereon and being rotatable about an axis thereof. The rotary means may comprise two wheels having the two guide heads which are movable secured thereon respectively and rotated about the axis thereof by a motor.

Alternatively, the means for displacing may include a pair of motors (an X-axis motor and a Y-axis motor for displacing the movable guide head or each of the movable guide heads along two mutually independent axes (X-axis and Y-axis), respectively, to cause it to follow a predetermined circular or closed-loop path. The means may also include servo means responsive to a gap electrical characteristic between the wire electrode and the workpiece for controlling the position and/or the rate of displacement of the movable guide head or each of the movable guide heads, thereby controlling the position and/or the rate of transverse movement of the wire electrode along the template contour.

BRIEF DESCRIPTION OF THE DRAWING

These and other objects, features and advantages of the present invention will be more readily understood from the following description of certain embodiments thereof which are given by way of example, reference being made to the accompanying drawing in which.

SPECIFIC DESCRIPTION

Figure 1:
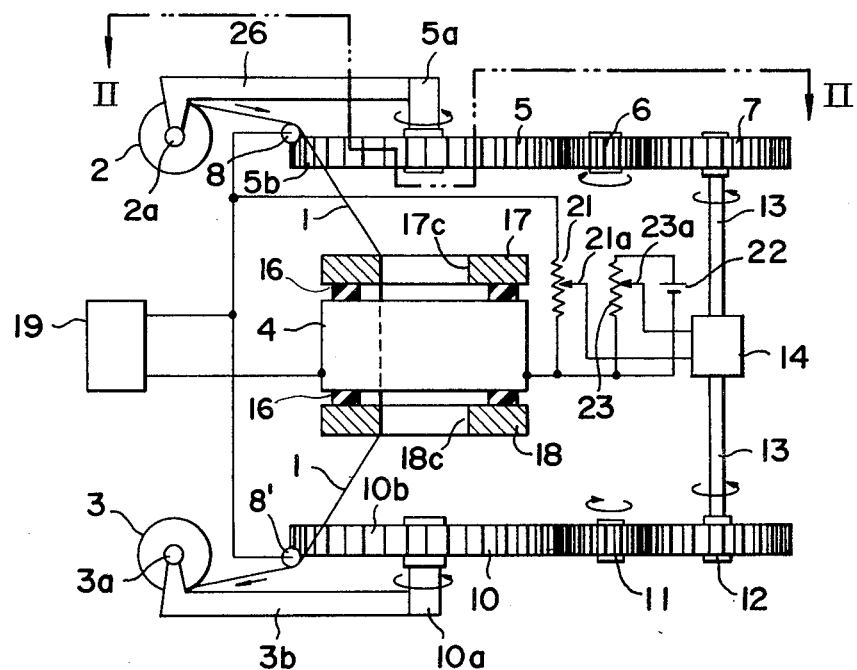
FIG. 1 is a side-elevational view diagrammatically illustrating a certain apparatus according to the invention.
Figure 2:
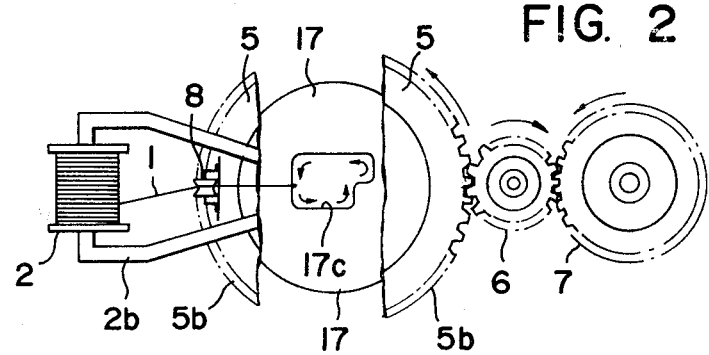
FIG. 2 is a diagrammatic plan view of the apparatus of FIG. 1 taken along the line 2—2.

In FIGS. 1 and 2, a continuous wire electrode 1 which may be composed of copper or a copper alloy such as brass and of a diameter of 0.05 to 0.5 mm is axially transported in the direction of the arrow between a supply reel 2 and a takeup reel 3 to continuously renew its machining surface as it traverses a workpiece 4 in a cutting zone in the conventional manner. Means for axially driving the wire electrode 1 includes traction roller means driven by a motor and disposed on the side of the takeup reel 3 and brake roller means driven by a motor and disposed on the side of the supply reel 2 and the adjustment of these means provides a desired rate of axial travel and tension of the wire electrode 1. These means and their manner of adjustment are well known and are therefore omitted from illustration for the sake of clarity and simplicity.

The supply reel 2 is shown having a shaft 2a about which it is rotated and a pair of arms 2b fixed to the shaft 2a and secured to a shaft 5a of a wheel 5. The wheel 5 is formed on its periphery with a toothed gear 5b which is coupled via an intermediary gear 6 with a gear wheel 7. The wheel 5 has a pulley or guide roller 8 rotatably secured thereon for carrying the wire electrode 1 being transported from the supply reel 2.

Similarly, the takeup reel 3 is shown having a shaft 3a about which it is rotated and a pair of arms 3b fixed to the shaft 3a and secured to a shaft 10a of a wheel 10. The wheel 10 is formed at its periphery with a gear 10b which is coupled via an intermediary gear 11 with a gear wheel 12. The wheel 10 has a pulley or guide roller 8' secured thereon for carrying the wire electrode 1 being transported onto the takeup reel 3.

The wheels 7 and 12 are axially coupled together by a shaft 13 which is rotatable by a servo motor 14. The gear transmission between the wheels 5 and 7 and between the wheels 10 and 12 respectively may, of course, be substituted by a belt transmission.

The guide rollers 8 and 8' carried by the wheels 5 and 10 constitute a pair of guide heads in the arrangement. Thus, when the wheels 7 and 12 are rotated in unison by the servo motor 14, the wheels 5 and 10 are rotated in unison, each carrying the reel 2, 3 and the guide roller 8, 8' which thus revolve around the shaft 5a, 10a.

Disposed on opposite sides of the workpiece between the heads 8 and 13 and between the wheels 5 and 10 are a pair of blocks 17 and 18 constituting template blocks in the invention. The blocks 17 and 18 are rigidly secured to the workpiece 4 via electrical insulator rings 16 and are each formed with an opening having an intricate contour 17c, 18c which is to be precisely reproduced in the workpiece 4 by wire-cutting electroerosion machining in accordance with the invention. The contour 17c and 18c are shown flush (i.e. in vertical alignment) with each other across the workpiece 4. As the wire guide rollers 8 and 8' are revolved about the shafts 5a and 10a of wheels 5 and 10 which are coaxial, the wire electrode 1 moves transversely to the axis thereof and follows the contours 17c and 18c of blocks 17 and 18.

An electroerosion power supply 19 has one output terminal 19a connected to the workpiece 4 and the other output terminal 19b connected to the wire electrode 1 via the guide rollers 8 and 8' which are electrically conductive and disposed on opposite sides of the workpiece 4 and the blocks 17 and 18. The power supply 19 has the workpiece 4 poled positive and may supply a DC current or a series of pulses for electrochemical or electrochemical-discharge electroerosion machining. For electrical-discharge electroerosion machining, the power supply 19 provides a series of pulses and has the workpiece 4 poled either negative or positive.

A sensing resistor 21 is connected to the output terminal 19b and the workpiece 4 to detect the gap spacing or a gap electrical characteristic between the wire electrode 1 and the workpiece 4 and has a reference voltage source 22 coupled therewith via a tapped resistor 23. The adjustable taps 21a and 23a of resistor 21 and resistor 23 develop a gap voltage and a reference voltage respectively, and are coupled together to develop a difference between these voltages and to apply it to the servo motor 14. The latter then controls the angle of rotation of the shaft 13 and hence the angle of revolution of the guide rollers 8 and 13 about the axis 5a, 10a and consequentially the position and/or rate of transverse movement of the wire electrode along the contours of the template blocks 17 and 18.

The blocks or templates 17 and 18 are formed with intricate contours 17c and 18c, one of which is shown in FIG. 2, to be followed by the wire electrode 1 while being transported across the workpiece 4 so as to shape the latter with a contour determined by the contour 17c and 18c by electroerosion machining. When the wire electrode 1 makes a journey around the contours 17c and 18c, the corresponding contour is formed in the workpiece 4.

The electroerosion machining fluid, i.e. a liquid electrolyte in electrochemical or electrochemical-discharge electroerosion machining or a liquid dielectric in electrical-discharge electroerosion machining, is supplied to the region of the workpiece 4 from one or more nozzles (not shown). Distilled water as commonly used in wire-cutting EDM is suitable. The workpiece 4 may be immersed in the machining fluid.

In operation, the motor 14 is operated to rotate the wheels 7 and 12 in unison. The rotations of wheels 7 and 12 are transmitted via intermediary gears 6 and 11 to wheels 5 and 10 so as to rotate them in unison about the shafts 5a and 10a, respectively, which are coaxial. As the wheels 5 and 10 rotate, the wire supply and takeup reels 2 and 3 connected to the shafts 5a and 10a via arms 2b and 3b are revolved about the axis of the shafts 5a and 10a and so are the guide rollers 8 and 13 which are attached to the wheels 5 and 10. Accordingly, a revolution of the wheels 5 and 10 about the shafts 5a and 10a completes a journey of the wire electrode 1 along the contours 17c and 18c of the blocks 17 and 18. During this revolving movement, the wire electrode is tightly stretched under a given tension between the guide rollers 8 and 13 and between the blocks 17 and 18 across the workpiece 4 and at the same time is continuously renewed from the supply reel 2 and continuously wound on the take-up reel 3. The wire electrode 1 is thus capable of following with high precision the contours 17c and 18c of the template blocks 17 and 18 to electroerosively machine with due precision the workpiece 4 so as to form the corresponding contour therein while the machining current is applied from the power supply 19 between the traveling wire electrode 1 and the workpiece 4 across the machining gap flooded with the machining fluid. The gap sensing resistor 21 continuously monitors the gap spacing between the traveling wire electrode 1 and the workpiece 4 to cause the motor 14 to be servo-driven and thereby control the position and rate of transverse movement of the wire electrode 1 along the template contours 17c and 18c or thereby maintain the gap spacing between the wire electrode 1 and the workpiece 4 substantially constant. A highly stabilized wire-cutting operation is accordingly ensured.

A desired wire-cutting of the workpiece 4 can thus be achieved easily and by simply using the wire electrode 1 as caused to move along the contours of the template blocks. In other words, the operation simply requires the preparation of blocks 17 and 18 shaped to correspond to a desired cut in the workpiece 4. Any desired cut in the workpiece can be obtained simply by the appropriate choice of shaped blocks. Further, wire electrodes of different diameters may be used to machine blanks with similar contours with a desired clearance, thus to produce a punch and die set.

Also, dies provided can be used as blocks 17 and 18 to be contour-followed by the wire electrode 1 to produce a punch.

Depending upon a contour to be machined in the workpiece, a block 17 or 18 may be disposed on one side only of the workpiece and a fixed guide surface may be provided on the other side. Blocks 17 and 18 of a given shape may be of a same size or alternatively different in size. In the latter case, a taper cutting with a taper based upon the difference in size can be formed in the workpiece.

A block or blocks 17, 18 may be formed with a template contour or pattern shaped externally on the periphery or peripheries thereof, instead of internally on the inner or bored contour as shown, such external contour to be followed by the wire electrode 1 traveling between the wheels 5 and 10. A punch or punches provided may be used as a block or blocks to be contour-followed by the wire electrode 1 to produce a die or dies for use with the punch or punches as a set.

Means for driving the heads to cause the wire electrode 1 to transversely move along the contour of a block 17, 18 may, instead of using a rotary wheel arrangement as shown, make use of a numerical control device or a pattern follower well known in the art. It is suitable to use a pair of motors (an X-axis motor and a Y-axis motor) for displacing the wire guide rollers or heads 8 and 13 along two mutually orthogonal axes (X-axis and Y-axis), respectively, to cause the heads 8 and 13 to follow a predetermined circular or closed-loop path. In all embodiments, the use of a template block or blocks 17, 18 shaped to correspond to a contour to be directly reproduced in the workpiece 4 is essential in the present invention.

What is claimed is:

1. A method of electroerosively machining a desired contour in a workpiece with a wire electrode axially transported from supply means to takeup means and supported under tension by a pair of wire guide heads so as to traverse the workpiece in a path therebetween while defining a liquid flooded electroerosive machining gap with the workpiece, the method comprising the steps of:

(a) disposing on at least one side of the two opposite surfaces of said workpiece traversed by said axially advancing wire electrode and in a predetermined fixed relationship with said workpiece a template block formed with a template contour corresponding to said desired contour to be machined in said workpiece;

(b) holding with said template contour said wire electrode advancing tightly stretched between said wire guide heads across said workpiece;

(c) electrically energizing said workpiece and said axially advancing wire electrode to electroerosively remove material from said workpiece across said machining gap; and (d) while holding with said template contour said wire electrode advancing tightly stretched between said wire guide heads across said workpiece, displacing at least one of said guide heads to cause said axially advancing wire electrode to move transversely to the axis thereof along said template contour so that with the transverse movement of said wire electrode, said desired contour is progressively formed in said workpiece by electroerosion.

2. The method defined in claim 1 wherein said template block has an opening formed internally with said template contour.

3. The method defined in claim 1 wherein said template block has a periphery formed internally with said template contour.

4. The method defined in claim 1 wherein said two such template blocks are disposed on the respective opposite sides of said workpiece.

5. The method defined in claim 4 wherein the template contours formed in said two blocks are identical in shape and size and are disposed flush with each other across the workpiece.

6. The method defined in claim 4 wherein the template contours formed in said two blocks are similar in shape but different in size and provide parallel contoured surfaces across said workpiece so that the contour machined in the workpiece has a predetermined taper.

7. The method defined in claim 1 wherein said at least one of heads is carried on rotary means rotated by a motor about an axis thereof to execute the step (d).

8. A method of electroerosively machining a desired contour in a workpiece with a wire electrode axially transported from supply means to takeup means and supported under tension by a pair of guide heads so as to traverse the workpiece in a path therebetween while defining a liquid flooded electroerosive machining gap with the workpiece, the method comprising the steps of:
(a) disposing on at least one side of the two opposite surfaces of the workpiece traversed by said axially advancing wire electrode and in a predetermined fixed relationship with said workpiece a template block formed with a template contour corresponding to said desired contour to be machined in said workpiece;
(b) holding with said template contour said wire electrode advancing tightly stretched between said guide heads across said workpiece;
(c) electrically energizing said workpiece and said axially advancing wire electrode to electroerosively remove material from the workpiece across said machining gap; and
(d) displacing at least one of said guide heads to cause said axially advancing wire electrode to move transversely to the axis thereof along said template contour, thereby permitting said desired contour to be progressively formed in said workpiece with said transverse movement of said wire electrode, wherein said template block has an opening formed internally with said template contour and is a female die with said formed template contour providing a female die surface and said workpiece is a male die with said machined contour providing a male die surface, said male and female dies being capable of use as a die set.

9. A method of electroerosively machining a desired contour in a workpiece with a wire electrode axially transported from supply means to takeup means and supported under tension by a pair of guide heads so as to traverse the workpiece in a path therebetween while defining a liquid flooded electroerosive machining gap with the workpiece, the method comprising the steps of:
(a) disposing on at least one side of the two opposite surfaces of the workpiece traversed by said axially advancing wire electrode and in a predetermined fixed relationship with said workpiece a template block formed with a template contour corresponding to said desired contour to be machined in said workpiece;
(b) holding with said template contour said wire electrode advancing tightly stretched between said heads across said workpiece;
(c) electrically energizing said workpiece and said axially advancing wire electrode to electroerosively remove material from said workpiece across said machining gap; and
(d) disposing at least one of said guide heads to cause said axially advancing wire electrode to move transversely to the axis thereof along said template contour, thereby permitting said desired contour to be progressively formed in said workpiece with said transverse movement of said wire electrode, wherein said template block has a periphery formed externally with said template contour and is a male die with said formed template contour providing a male die surface and said workpiece is a female die with said machining contour providing a female die surface, said male and female dies being capable of use as a die set.

10. A method of electroerosively machining a desired contour in a workpiece with a wire electrode axially transported from supply means to takeup means and supported under tension by a pair of guide heads so as to traverse the workpiece in a path therebetween while defining a liquid flooded electroerosive machining gap with the workpiece, the method comprising the steps of:
(a) disposing on at least one side of the two opposite surfaces of the workpiece traversed by said axially advancing wire electrode and in a predetermined fixed relationship with said workpiece a template block formed with a template contour corresponding to said desired contour to be machined in said workpiece;
(b) holding with said template contour said wire electrode advancing tightly stretched between said guide heads across said workpiece;
(c) electrically energizing said workpiece and said axially advancing wire electrode to electroerosively remove material from the workpiece across said machining gap;
(d) displacing at least one of said guide heads to cause said axially advancing wire electrode to move transversely to the axis thereof along said template contour, thereby permitting said desired contour to be progressively formed in said workpiece with said transverse movement of the wire electrode;
(e) servo-controlling the displacement in step (d) of said at least one of said guide heads.

11. The method defined in claim 10 wherein said step (e) comprises:
(e1) sensing a gap electrical characteristic between said workpiece and said wire electrode to provide a displacement control signal; and
(e2) controlling with said signal at least one of the instantaneous positions and rate of displacement of said at least one of the wire guide heads, thereby controlling said transverse movement of the wire electrode along said template contour.

12. An apparatus for electroerosively machining a desired contour in a workpiece with a wire electrode axially transported from supply means to takeup means and supported to traverse the workpiece while defining a liquid flooded electroerosive machining gap with the workpiece, said apparatus comprising:
a pair of wire guide heads disposed in a path of said wire electrode between said supply means and said takeup means for supporting said advancing wire electrode tightly under tension between said wire guide heads;
a template block securely mounted relative to said workpiece on at least one side of the two opposite surfaces thereof traversed by said wire electrode, said template block having a contour formed therein corresponding to said desired contour to be machined in said workpiece for holding said wire electrode advancing tightly stretched between said wire guide heads across said workpiece;

an electric power supply for electrically energizing said workpiece and said wire electrode to electroerosively remove material from said workpiece across said machining gap;

means for displacing at one of said guide heads to cause said axially advancing wire electrode to move transversely to the axis thereof along said template contour, thereby permitting said desired contour to be progressively formed in said workpiece with said transverse movement of the wire electrode; and means associated with said displacing means for tightly stretching said axially advancing wire electrode and holding it with said template contour while said at least one of wire guide heads is being displaced by said displacing means.

13. The apparatus defined in claim 12 wherein said means for displacing includes rotary means having said at least one of wire guide heads secured thereon and being rotatable about an axis thereof.

14. The apparatus defined in claim 13 wherein said rotary means comprises two wheels having two guide heads secured thereon respectively and being rotatable about said axis by a motor.

15. An apparatus for electroerosively machining a desired closed-loop contour in a workpiece with a wire electrode axially transported from supply means to takeup means and supported to traverse the workpiece while defining a liquid flooded electroerosive machining gap with the workpiece, said apparatus comprising:

a pair of guide heads disposed in a path of said wire electrode between said supply means and said takeup means for supporting said advancing wire electrode tightly under tension between said guide heads;

a template block securely mounted relative to said workpiece on at least one side of the two opposite surfaces thereof traversed by said wire electrode, said template block having a closed-loop contour formed therein corresponding to said desired closed-loop contour to be machined in said workpiece for holding said wire electrode advancing tightly stretched between said heads across said workpiece;

an electric power supply for electrically energizing said workpiece and said wire electrode to electroerosively remove material from said workpiece across said machining gap; and means including at least a pair of motors for displacing at least one of said wire guide heads in the direction of two mutually independently or orthogonal axes to displace said at least one guide heads along a predetermined closed-loop path essentially in parallel with said template contour to cause said axially advancing wire electrode to move transversely to the axis thereof along said template contour, thereby permitting said desired contour to be progressively formed in said workpiece with said transverse movement of the wire electrode.

16. The apparatus defined in claim 15, further comprising servo means responsive to a gap electrical characteristic between said wire electrode and said workpiece for controlling the rotation of said motors to control at least one of the instantaneous position and rate of displacement of said at least one of said wire guide heads, thereby controlling the transverse movement of the wire electrode along said template contour.

17. A method of electroerosively machining desired contours of a similar shape but different sizes in workpieces with wire electrodes each of which is axially transported from supply means to takeup means and supported under tension by a pair of guide heads so as to traverse each of the workpieces in a path between the guide heads while defining a liquid flooded electroerosive machining gap with said each workpiece, the method comprising the steps of:

(a) disposing, on at least one side of the two opposite surfaces of a first of said workpieces traversed by a first of said wire electrodes and in a predetermined fixed relationship with said first workpiece, a template block formed with a template contour corresponding to said similar desired contours one of which is to be machined in said first workpiece and another of which is to be machined in a second of said workpiece;

(b) holding with said template contour said first wire electrode advancing tightly stretched between said guide heads across said first workpiece;

(c) electrically energizing said first workpiece and said axially advancing first wire electrode to electroerosively remove material from said first workpiece across said machining gap;

(d) displacing at least one of said guide heads to cause said axially advancing first wire electrode to move transversely to the axis thereof along said template contour, thereby permitting said one desired contour to be progressively machined in said first workpiece with said transverse movement of said first wire electrode;

(e) disposing said template block on said at least one side of the two opposite surfaces of a second of said workpieces traversed by a second of said wire electrodes which is different in thickness from said first by a predetermined difference and in a predetermined fixed relationship with said second workpiece;

(f) holding with said template contour said second wire electrode advancing tightly stretched between said guide heads across said second workpiece;

(g) electrically energizing said second workpiece and said axially advancing second wire electrode to electroerosively remove material from said second workpiece across said machining gap; and (h) displacing said at least one of the guide heads to cause said axially advancing second wire electrode to move transversely to the axis thereof along said template contour, thereby permitting said other desired contour to be progressively machined in said second workpiece, wherein:

one of said first and second workpieces is a female die and the other is a male die surface, respectively, said female and male dies being for use as a die set.

18. A method of electroerosively machining a desired closed-loop contour in a workpiece with a wire electrode axially transported from supply means to takeup means and supported under tension by a pair of guide heads so as to traverse the workpiece in a path therebetween while defining a liquid flooded electroerosive machining gap with the workpiece, the method comprising the steps of:

(a) disposing on at least one side of the two opposite surfaces of said workpiece traversed by said axially advancing wire electrode and in a predetermined fixed relationship with said workpiece a template block formed with a template contour corresponding to said desired contour to be machined in said workpiece;

(b) holding with said template contour said wire electrode advancing tightly stretched between said guide heads across said workpiece;

(c) electrically energizing said workpiece and said axially advancing wire electrode to electroerosively remove material from said workpiece across said machining gap; and (d) displacing under numerical control at least one of said guide heads along a closed-loop path of displacement essentially in parallel with said template contour to cause said axially advancing wire electrode to move transversely to the axis thereof along said template contour, thereby permitting said desired contour to be progressively formed in said workpiece with said transverse movement of the wire electrode.

19. An apparatus for electroerosively machining a desired contour in a workpiece with a wire electrode axially transported from supply means to takeup means and supported to transverse the workpiece while defining a liquid flooded electroerosive machining gap with the workpiece, said apparatus comprising:

a pair of wire guide heads disposed in a path of said wire electrode between said supply means and said takeup means for supporting said advancing wire electrode tightly under tension between said wire guide heads;

a template block securely mounted relative to said workpiece on at least one side of the two opposite surfaces thereof traversed by said wire electrode, said template block having a contour to be machined in the workpiece for holding said wire electrode advancing tightly stretched between said wire guide heads across said workpiece;

an electrical power supply for electrically energizing said workpiece and said wire electrode to electroerosively remove material from said workpiece across said machining gap;

means for displacing at least one of said guide heads to cause said axially advancing wire electrode to move transversely to the axis thereof along said template contour, thereby permitting said desired contour to be progressively formed in said workpiece with said transverse movement of the wire electrode; and a servo-control circuit responsive to a gap electrical characteristic between said workpiece and said wire electrode for controlling at least one of the instantaneous positions and rate of displacement of said at least one of wire guide heads, thereby controlling said transverse movement of the wire electrode along said template contour.

* * * * *